US009467896B2

(12) United States Patent
Cui et al.

(10) Patent No.: US 9,467,896 B2
(45) Date of Patent: Oct. 11, 2016

(54) TRAFFIC STEERING ACROSS RADIO ACCESS TECHNOLOGIES AND RADIO FREQUENCIES UTILIZING CELL BROADCAST MESSAGES

(71) Applicants: AT&T Intellectual Property I, L.P., Atlanta, GA (US); AT&T Mobility II LLC, Atlanta, GA (US)

(72) Inventors: Zhi Cui, Sugar Hill, GA (US); Arthur Richard Brisebois, Cumming, GA (US); Ye Chen, Sandy Springs, GA (US); Yonghui Tong, Alpharetta, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 241 days.

(21) Appl. No.: 13/707,531

(22) Filed: Dec. 6, 2012

(65) Prior Publication Data
US 2014/0162626 A1 Jun. 12, 2014

(51) Int. Cl.
*H04W 28/08* (2009.01)
*H04W 48/12* (2009.01)

(52) U.S. Cl.
CPC ............. *H04W 28/08* (2013.01); *H04W 48/12* (2013.01)

(58) Field of Classification Search
CPC .................................................... H04W 28/08
See application file for complete search history.

(56) References Cited

U.S. PATENT DOCUMENTS

| | | | |
|---|---|---|---|
| 5,953,677 | A | 9/1999 | Sato |
| 6,314,308 | B1 | 11/2001 | Sheynblat et al. |
| 6,430,168 | B1 | 8/2002 | Djurkovic et al. |
| 6,628,946 | B1 | 9/2003 | Wiberg et al. |
| 7,082,305 | B2 | 7/2006 | Willars et al. |
| 7,116,970 | B2 | 10/2006 | Brusilovsky et al. |
| 7,146,130 | B2 | 12/2006 | Hsu et al. |
| 7,299,019 | B1 | 11/2007 | Austin et al. |
| 7,400,600 | B2 | 7/2008 | Mullany et al. |
| 7,400,886 | B2 | 7/2008 | Sahim et al. |
| 7,440,755 | B2 | 10/2008 | Balachandran |
| 7,496,060 | B2 | 2/2009 | Ramirez et al. |
| 7,508,781 | B2 | 3/2009 | Liu et al. |

(Continued)

FOREIGN PATENT DOCUMENTS

| | | |
|---|---|---|
| AU | 2005320356 | 12/2005 |
| EP | 2244503 | 10/2010 |

(Continued)

OTHER PUBLICATIONS

Feng, S. et al., "Self-Organizing Networks (SON) in 3GPP Long Term Evolution," Novel Mobile Radio Research, May 20, 2008.

(Continued)

*Primary Examiner* — Mazda Sabouri
(74) *Attorney, Agent, or Firm* — Hartman & Citrin LLC

(57) ABSTRACT

Concepts and technologies are described herein for traffic steering across radio access technologies and radio frequencies utilizing cell broadcast messages. According to one aspect disclosed herein, a base station can collect load information of the base station. The base station can also generate a cell broadcast message that includes the load information. The base station can also send the cell broadcast message to a target mobile device. The target mobile device can be configured to determine, based at least in part upon the load information, which radio access network of a plurality of radio access networks to connect to.

20 Claims, 8 Drawing Sheets

(56) References Cited

U.S. PATENT DOCUMENTS

| | | |
|---|---|---|
| 7,590,422 B1 | 9/2009 | Chow et al. |
| 7,653,392 B2 | 1/2010 | Ovadia et al. |
| 7,680,469 B2 | 3/2010 | Fry |
| 7,924,787 B2 | 4/2011 | Lee |
| 7,929,964 B2 | 4/2011 | Arumi et al. |
| 7,936,708 B2 | 5/2011 | Kesavan et al. |
| 7,983,713 B2 | 7/2011 | Sasse et al. |
| 8,045,980 B2 | 10/2011 | Buckley et al. |
| 8,068,843 B2 | 11/2011 | Yi et al. |
| 8,073,453 B2 | 12/2011 | Funnell |
| 8,121,090 B1 | 2/2012 | Dinan et al. |
| 8,121,607 B2 | 2/2012 | Fang et al. |
| 8,126,461 B2 | 2/2012 | Sengupta et al. |
| 8,212,661 B2 | 7/2012 | Shuster |
| 8,254,982 B2 | 8/2012 | Kuningas |
| 8,270,975 B2 | 9/2012 | Kim et al. |
| 8,270,991 B2 | 9/2012 | Zhao |
| 8,271,025 B2 | 9/2012 | Brisebois et al. |
| 8,279,831 B2 | 10/2012 | Sengupta et al. |
| 8,280,377 B2 | 10/2012 | Lee et al. |
| 8,305,970 B2 | 11/2012 | Park et al. |
| 8,325,661 B2 | 12/2012 | Montojo et al. |
| 8,331,228 B2 | 12/2012 | Huber et al. |
| 8,331,929 B2 | 12/2012 | Brisebois et al. |
| 8,364,156 B2 | 1/2013 | Chun et al. |
| 8,385,917 B2 | 2/2013 | Brisebois |
| 8,391,141 B2 | 3/2013 | Rune et al. |
| 8,391,238 B2 | 3/2013 | Rune et al. |
| 8,396,480 B2 | 3/2013 | Prytz et al. |
| 8,417,823 B2 | 4/2013 | Luna et al. |
| 8,467,786 B2 | 6/2013 | Salkintzis |
| 8,488,586 B2 | 7/2013 | Centonza et al. |
| 8,493,935 B2 | 7/2013 | Zisimopoulos |
| 8,510,801 B2 | 8/2013 | Majmundar et al. |
| 8,522,312 B2 | 8/2013 | Huber et al. |
| 8,649,291 B2 | 2/2014 | Wang et al. |
| 8,675,583 B2 | 3/2014 | Lee et al. |
| 8,885,613 B2 | 11/2014 | Sachs et al. |
| 2002/0123365 A1 | 9/2002 | Thorson et al. |
| 2003/0078075 A1 | 4/2003 | Mcnicol |
| 2003/0117953 A1 | 6/2003 | Kinahan et al. |
| 2004/0165538 A1 | 8/2004 | Swami |
| 2005/0227696 A1 | 10/2005 | Kaplan et al. |
| 2006/0128394 A1* | 6/2006 | Turina et al. ................ 455/453 |
| 2006/0166677 A1 | 7/2006 | Derakshan et al. |
| 2006/0199608 A1 | 9/2006 | Dunn et al. |
| 2007/0026854 A1 | 2/2007 | Nath |
| 2007/0091847 A1 | 4/2007 | Lee |
| 2007/0140163 A1 | 6/2007 | Meier et al. |
| 2007/0184835 A1 | 8/2007 | Bitran et al. |
| 2007/0253355 A1* | 11/2007 | Hande et al. ................ 370/328 |
| 2007/0286092 A1 | 12/2007 | Famolari et al. |
| 2008/0144577 A1 | 6/2008 | Huang et al. |
| 2008/0200146 A1 | 8/2008 | Wang et al. |
| 2009/0068970 A1 | 3/2009 | Ahmed et al. |
| 2009/0088160 A1 | 4/2009 | Pani et al. |
| 2009/0154423 A1 | 6/2009 | Song et al. |
| 2009/0164813 A1 | 6/2009 | Tu et al. |
| 2009/0209263 A1 | 8/2009 | Breuer et al. |
| 2009/0252059 A1 | 10/2009 | Vigue et al. |
| 2010/0048205 A1 | 2/2010 | Guilford et al. |
| 2010/0056153 A1* | 3/2010 | Attar et al. ................ 455/436 |
| 2010/0056181 A1 | 3/2010 | Rippon et al. |
| 2010/0110890 A1 | 5/2010 | Rainer et al. |
| 2010/0136978 A1 | 6/2010 | Cho et al. |
| 2010/0149971 A1 | 6/2010 | Noriega |
| 2010/0234021 A1 | 9/2010 | Ngai et al. |
| 2010/0234042 A1 | 9/2010 | Chan et al. |
| 2010/0255849 A1 | 10/2010 | Ore |
| 2010/0267384 A1 | 10/2010 | Dwyer et al. |
| 2010/0279601 A1 | 11/2010 | Phan et al. |
| 2010/0296415 A1 | 11/2010 | Sachs et al. |
| 2010/0296474 A1 | 11/2010 | Noriega |
| 2010/0311435 A1* | 12/2010 | Mueck et al. ................ 455/453 |
| 2011/0070863 A1 | 3/2011 | Ma et al. |
| 2011/0072101 A1 | 3/2011 | Forssell et al. |
| 2011/0075557 A1 | 3/2011 | Chowdhury et al. |
| 2011/0128907 A1 | 6/2011 | Kvernvik |
| 2011/0142006 A1 | 6/2011 | Sachs |
| 2011/0149879 A1 | 6/2011 | Noriega et al. |
| 2011/0176424 A1* | 7/2011 | Yang ................ H04L 41/0803 370/236.2 |
| 2011/0235615 A1 | 9/2011 | Kalhan |
| 2011/0261695 A1 | 10/2011 | Zhao et al. |
| 2011/0263260 A1 | 10/2011 | Yavuz et al. |
| 2011/0306386 A1 | 12/2011 | Centoza et al. |
| 2012/0013504 A1 | 1/2012 | Raento et al. |
| 2012/0021725 A1 | 1/2012 | Rune |
| 2012/0057503 A1 | 3/2012 | Ding et al. |
| 2012/0108252 A1 | 5/2012 | Dimou et al. |
| 2012/0142352 A1 | 6/2012 | Zhang et al. |
| 2012/0166604 A1 | 6/2012 | Fortier et al. |
| 2012/0195290 A1 | 8/2012 | Bienas |
| 2012/0214525 A1 | 8/2012 | Fujii et al. |
| 2012/0236717 A1* | 9/2012 | Saska et al. ................ 370/235 |
| 2012/0258674 A1 | 10/2012 | Livet et al. |
| 2012/0258715 A1 | 10/2012 | Souissi et al. |
| 2012/0264412 A1 | 10/2012 | Tervonen et al. |
| 2012/0275371 A1 | 11/2012 | Somasundaram et al. |
| 2012/0294293 A1 | 11/2012 | Kahn et al. |
| 2012/0315905 A1 | 12/2012 | Zhu et al. |
| 2012/0324100 A1 | 12/2012 | Tomici et al. |
| 2013/0005344 A1 | 1/2013 | Dimou et al. |
| 2013/0012182 A1 | 1/2013 | Liao |
| 2013/0021929 A1 | 1/2013 | Kim |
| 2013/0021962 A1 | 1/2013 | Hu et al. |
| 2013/0023302 A1 | 1/2013 | Sivanesan et al. |
| 2013/0028081 A1 | 1/2013 | Yang et al. |
| 2013/0028184 A1 | 1/2013 | Lee et al. |
| 2013/0029708 A1 | 1/2013 | Fox et al. |
| 2013/0045740 A1 | 2/2013 | Gayde et al. |
| 2013/0051379 A1 | 2/2013 | Wang et al. |
| 2013/0053038 A1 | 2/2013 | Lee et al. |
| 2013/0065562 A1 | 3/2013 | Singh |
| 2013/0065585 A1 | 3/2013 | Pelletier et al. |
| 2013/0065589 A1 | 3/2013 | Lee et al. |
| 2013/0111038 A1 | 5/2013 | Girard |
| 2013/0121145 A1 | 5/2013 | Draznin et al. |
| 2013/0121322 A1 | 5/2013 | Salkintzis |
| 2013/0143526 A1 | 6/2013 | Kanugovi et al. |
| 2013/0143542 A1* | 6/2013 | Kovvali ................ H04W 48/18 455/418 |
| 2013/0155849 A1 | 6/2013 | Koodli et al. |
| 2013/0165131 A1 | 6/2013 | Garcia Martin et al. |
| 2013/0170351 A1 | 7/2013 | Reznik et al. |
| 2013/0176988 A1 | 7/2013 | Wang et al. |
| 2013/0183976 A1 | 7/2013 | Zhuang et al. |
| 2013/0188499 A1 | 7/2013 | Mach et al. |
| 2013/0189996 A1 | 7/2013 | Sridhar et al. |
| 2013/0208696 A1 | 8/2013 | Garcia Martin et al. |
| 2013/0210434 A1 | 8/2013 | Dimou et al. |
| 2013/0230011 A1 | 9/2013 | Rinne et al. |
| 2013/0308445 A1 | 11/2013 | Xiang et al. |
| 2013/0322238 A1 | 12/2013 | Sirotkin |
| 2014/0029420 A1 | 1/2014 | Jeong et al. |
| 2014/0092306 A1 | 4/2014 | Lee et al. |
| 2014/0092734 A1 | 4/2014 | Ljung |
| 2014/0099945 A1 | 4/2014 | Singh et al. |
| 2014/0128074 A1 | 5/2014 | Vangala et al. |
| 2014/0141785 A1 | 5/2014 | Wang et al. |
| 2014/0161256 A1 | 6/2014 | Bari et al. |
| 2014/0204745 A1 | 7/2014 | Nuss |
| 2014/0247810 A1 | 9/2014 | Bontu et al. |
| 2014/0274066 A1* | 9/2014 | Fodor et al. ................ 455/437 |
| 2014/0335870 A1 | 11/2014 | Yilmaz et al. |
| 2015/0208280 A1 | 7/2015 | Lorca Hernando |
| 2015/0244520 A1 | 8/2015 | Kariman |

FOREIGN PATENT DOCUMENTS

| | | |
|---|---|---|
| EP | 2197228 | 12/2011 |
| EP | 2533571 | 12/2012 |
| EP | 2632072 | 8/2013 |
| EP | 2603046 | 12/2013 |

(56) References Cited

FOREIGN PATENT DOCUMENTS

| WO | WO 2010/130134 | 11/2010 |
|---|---|---|
| WO | WO 2011/053204 | 5/2011 |
| WO | WO2012121757 | 9/2012 |
| WO | WO2012149954 | 11/2012 |
| WO | WO2012168152 | 12/2012 |
| WO | WO2013127691 | 9/2013 |

OTHER PUBLICATIONS

Greenpacket, "Wi-Fi Offload: Authentication and Security Through EAP-Based Approach," Interface, May 2012.
"Universal Mobile Telecommunications System (UMTS); LTE; Access Network Discovery and Selection Function (ANDSF) Management Object (MO)," 3GPP TS 24.312, ETSI TS 124 312 v11.4.0 (Oct. 2012).
U.S. Appl. No. 13/707,551, filed Dec. 6, 2012.
U.S. Appl. No. 13/707,532, filed Dec. 6, 2012.
U.S. Appl. No. 13/707,534, filed Dec. 6, 2012.
U.S. Appl. No. 13/707,535, filed Dec. 6, 2012.
U.S. Appl. No. 13/707,538, filed Dec. 6, 2012.
U.S. Appl. No. 13/707,539, filed Dec. 6, 2012.
U.S. Appl. No. 14/064,329, filed Oct. 28, 2013.
U.S. Appl. No. 13/681,141, filed Nov. 19, 2012.
U.S. Appl. No. 13/748,454, filed Jan. 23, 2013.
U.S. Appl. No. 14/035,584, filed Sep. 24, 2013.
U.S. Appl. No. 14/059,401, filed Oct. 21, 2013.
U.S. Appl. No. 14/084,578, filed Nov. 19, 2013.
Office Action mailed Jun. 27, 2012 in U.S. Appl. No. 12/946,611.
Office Action mailed Mar. 22, 2012 in U.S. Appl. No. 12/946,611.
Office Action mailed Mar. 13, 2012 in U.S. Appl. No. 12/624,643.
Notice of Allowance mailed Aug. 8, 2012 in U.S. Appl. No. 12/624,643.
Office Action mailed Apr. 22, 2013 in U.S. Appl. No. 13/681,141.
Desta Haileselassie Hagos, Rudiger Kapitza, "Study on Performance-Centric Offload Strategies for LTE Networks," TU Braunschweig, Wireless and Mobile Networking Conference (WMNC), 2013 6th Joint IFIP, 2013.
Desta Haileselassie Hagos, "The Performance of WiFi Offload in LTE Networks," Master's Thesis, Lulea University of Technology, Jun. 2012.
Heinonen et al., "Advanced EPC Architecture for Smart Traffic Steering," MEVICO, Nov. 2011.
ETSI, "Universal Mobile Telecommunications System (UMTS); LTE; Access Network Discovery and Selection Function (ANDSF) Management Object (MO)," Apr. 2013, Version 11.6.0, Release 11, France.
DESH, "15 Cellphone chargers that harness kinetic energy for a clean recharge". Copyright Instablogs Network 2009. http://www.greendiary.com/entry/15-cellphone-chargers-that-harness-kinetic-energy-for-a-clean-recharge/. Last accessed Feb. 15, 2011, 10 pages.
Nicole Casal Moore, "Tiny Generators run on good vibrations". Copyright 2009-2011 Futurity.org. http://www.futurity.org/science-technology/tiny-generators-run-on-good-vibrations/ Last accessed Feb. 15, 2011, 5 pages.
Noel McKeegan, "Good vibrations: tiny generator harnesses kinetic energy to power wireless electrical systems". Copyright gizmag 2003-2011. http://www.gizmag.com/go/7584/. Last accessed Feb. 15, 2011, 4 pages.
S.P. Beeby, et al., "Kinetic Energy Harvesting". ACT Workshop on Innovative Concepts. ESA-ESTEC Jan. 28-29, 2008. http://www.esa.int/gsp/Act/events/workshops/ACT-ART-Bridge2Space-Beeby.pdf Last accessed Feb. 15, 2011, 10 pages.
"Directory:Human-Powered". http://peswiki.com/index.php/Directory:Human-Powered Last accessed Feb. 15, 2011, 11 pages.
Alkhawlani et al., "Intelligent radio network selection for next generation networks," Informatics and Systems (INFOS), 2010 The 7th International Conference on, 2010, pp. 1, 7, 28-30.
Changqing et al., "Optimal Channel Access for TCP Performance Improvement in Cognitive Radio Networks: A Cross-Layer Design Approach," Global Telecommunications Conference, 2009. GLOBECOM 2009. IEEE, 2009, pp. 1, 6.
Samdanis et al., "Traffic Offload Enhancements for eUTRAN," Communications Surveys & Tutorials, IEEE, 2012, vol. 14, No. 3, pp. 884,896.
Watanabe et al., "Radio network selection scheme notified by the each network's real-time performance in the multi-layered communication network," Wireless Personal Multimedia Communications (WPMC), 2012 15th International Symposium on, 2012, pp. 169, 171, 24-27.
Kwon et al., "Load Based Cell Selection Algorithm for Faulted Handover in Indoor Femtocell Network," Vehicular Technology Conference (VTC Spring), 2011 IEEE 73rd, 2011, pp. 1, 5, 15-18.
Wei et al., "A mobility load balancing optimization method for hybrid architecture in self-organizing network," Communication Technology and Application (ICCTA 2011), IET International Conference on, 2011, pp. 828, 832.
"Macro to small cell, metro cell Hand-in" Alcatel-Lucent, AT&T R3-112026, 3GPP TSG-RAN3 Meeting #73, Athens, Greece, Aug. 22-26, 2011 http://www.3gpp.org/ftp/Specs/html-info/TDocExMtg--R3-73--28511.htm.
Stemm, Mark, and Randy H. Katz. "Vertical handoffs in wireless overlay networks." Mobile Networks and applications 3.4 (1998): 335-350. http://morse.colorado.edu/~timxb/5520/ho/8.pdf.
Chiu, Ming-Hsing, and Mostafa A. Bassiouni. "Predictive schemes for handoff prioritization in cellular networks based on mobile positioning." Selected Areas in Communications, IEEE Journal on 18.3 (2000): 510-522. http://dx.doi.org/10.1109/49.840208.
Soh, Wee-Seng, and Hyong S. Kim. "QoS provisioning in cellular networks based on mobility prediction techniques." Communications Magazine, IEEE 41.1 (2003): 86-92. http://citeseerx.ist.psu.edu/viewdoc/download?doi=10.1.1.98.2622&rep=rep1&type=pdf.
Pollini, Gregory P. "Trends in handover design." Communications Magazine, IEEE 34.3 (1996):82-90. http://inrg.csie.ntu.edu.tw/course/wms/paper/Pollin96.pdf.
Office Action mailed Sep. 13, 2013 in U.S. Appl. No. 13/681,141.
Notice of Allowance mailed Nov. 2, 2012 in U.S. Appl. No. 12/946,611.
Raza, Syed Numan, "LTE Performance Study," Master of Science Thesis, Feb. 9, 2012.
Jin et al., "SoftCell: Taking Control of Cellular Core Networks," May 15, 2013, Princeton University, Bell Labs.
Bernardos, Carlos J., "Final architecture design," Seventh Framework Programme, 2012, Medieval.
Stavroulaki et al., "Cognitive Control Channels: From Concept to Identification of Implementation Options," IEEE Communications Magazine, Jul. 2012, pp. 96-108, IEEE.
U.S. Appl. No. 14/520,020, filed Oct. 21, 2014.
U.S. Appl. No. 13/707,532 Office Action mailed Jun. 24, 2014.
Office Action mailed Mar. 12, 2014 in U.S. Appl. No. 13/707,551.
Office Action mailed Apr. 7, 2014 in U.S. Appl. No. 13/681,141.
U.S. Office Action dated Mar. 4, 2015 in U.S. Appl. No. 13/707,534.
U.S. Office Action dated Mar. 24, 2015 in U.S. Appl. No. 13/707,551.
U.S. Office Action dated Feb. 19, 2015 in U.S. Appl. No. 14/084,578.
U.S. Office Action dated Nov. 17, 2014 in U.S. Appl. No. 13/707,535.
U.S. Office Action dated Dec. 10, 2014 in U.S. Appl. No. 13/707,551.
U.S. Office Action dated Dec. 24, 2014 U.S. Appl. No. 13/707,538.
U.S. Office Action dated Jan. 22, 2015 in U.S. Appl. No. 13/707,539.
U.S. Office Action dated Jan. 22, 2015 in U.S. Appl. No. 14/059,041.
U.S. Office Action dated Jul. 20, 2015 in U.S. Appl. No. 13/707,534.
U.S. Office Action dated May 12, 2015 in U.S. Appl. No. 13/707,535.
U.S. Office Action dated Jul. 1, 2015 in U.S. Appl. No. 13/707,538.
U.S. Office Action dated Jun. 17, 2015 in U.S. Appl. No. 14/084,578.

(56) References Cited

OTHER PUBLICATIONS

U.S. Office Action dated May 11, 2015 in U.S. Appl. No. 14/064,329.
U.S. Office Action dated May 19, 2015 in U.S. Appl. No. 14/035,584.
U.S. Office Action dated Sep. 18, 2015 in U.S. Appl. No. 14/520,020.
U.S. Office Action dated Sep. 17, 2015 in U.S. Appl. No. 13/707,539.
U.S. Office Action dated Sep. 30, 2015 in U.S. Appl. No. 13/707,551.
U.S. Office Action dated Sep. 30, 2015 in U.S. Appl. No. 13/707,535.
U.S. Office Action dated Feb. 25, 2016 in U.S. Appl. No. 13/707,535.
U.S. Office Action dated Apr. 14, 2016 in U.S. Appl. No. 13/707,551.
U.S. Office Action dated Nov. 16, 2015 in U.S. Appl. No. 13/707,534.
U.S. Notice of Allowance dated Nov. 13, 2015 in U.S. Appl. No. 13/707,538.
U.S. Notice of Allowance dated Dec. 14, 2015 in U.S. Appl. No. 14/035,584.
U.S. Office Action dated Aug. 12, 2016 in U.S. Appl. No. 13/707,551.

\* cited by examiner

TRAFFIC STEERING ACROSS RADIO ACCESS TECHNOLOGIES AND RADIO FREQUENCIES UTILIZING CELL BROADCAST MESSAGES

TECHNICAL FIELD

The concepts and technologies disclosed herein generally relate to wireless telecommunications. More specifically, the concepts and technologies disclosed herein relate to traffic steering across radio access technologies and radio frequencies utilizing cell broadcast messages.

BACKGROUND

In recent years, mobile telecommunications carriers have experienced a dramatic increase in traffic on their networks, and this trend will likely continue. This increase in traffic has been caused in part by the increased adoption of smartphones and other devices that rely on mobile telecommunications networks, and the migration of many customers from utilizing landline telecommunication services to utilizing mobile telecommunication services for their communications needs. To meet the demands of higher traffic and to improve the end user experience, mobile telecommunications carriers are examining mechanisms by which to improve network efficiency, network capacity, and the end user experience, while keeping operational costs at a level conducive to maintaining competitive rates for the services they provide.

SUMMARY

Concepts and technologies are described herein for traffic steering across radio access technologies and radio frequencies utilizing cell broadcast messages. According to one aspect disclosed herein, a method includes operations performed by a base station. The operations can include collecting load information of the base station, generating a cell broadcast message that includes the load information, and sending the cell broadcast message to a target mobile device configured to determine, based at least in part upon the load information, which radio access network ("RAN") of one or more RANs to connect to.

According to another aspect disclosed herein, a base station includes a processor and a memory. The memory can include computer-executable instructions that, when executed by the processor, cause the base station to perform operations. The operations can include collecting load information of the base station, generating a cell broadcast message that includes the network load information, and sending the cell broadcast message to a target mobile device configured to determine, based at least in part upon the load information, which RAN of one or more RANs to connect to.

According to another aspect disclosed herein, a computer-readable storage medium can include computer-executable instructions that, when executed by a processor of a base station, cause the base station to perform operations. The operations can include collecting load information of the base station, generating a cell broadcast message that includes the network load information, and sending the cell broadcast message to a target mobile device configured to determine, based at least in part upon the load information, which RAN of one or more RANs to connect to.

In some embodiments, the RANs operate in accordance with different RATs. In some other embodiments, the RANs operate in accordance with the same RATs but different radio frequencies.

In some embodiments, the operations also include learning load information of at least one neighbor base station and providing this load information to the mobile device in the cell broadcast message. In some embodiments, the base station learns the load information of at least one neighbor base station via a self-organizing network ("SON") feature.

In some embodiments, the operations also include learning load information of at least one overlapping cell that is associated with a different RAT from RAT utilized by the base station and providing this load information to the mobile device in the cell broadcast message.

In some embodiments, the operations also include learning load information of at least one overlapping cell that is associated with a different frequency from the frequency utilized by the base station and providing this load information to the mobile device in the cell broadcast message.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
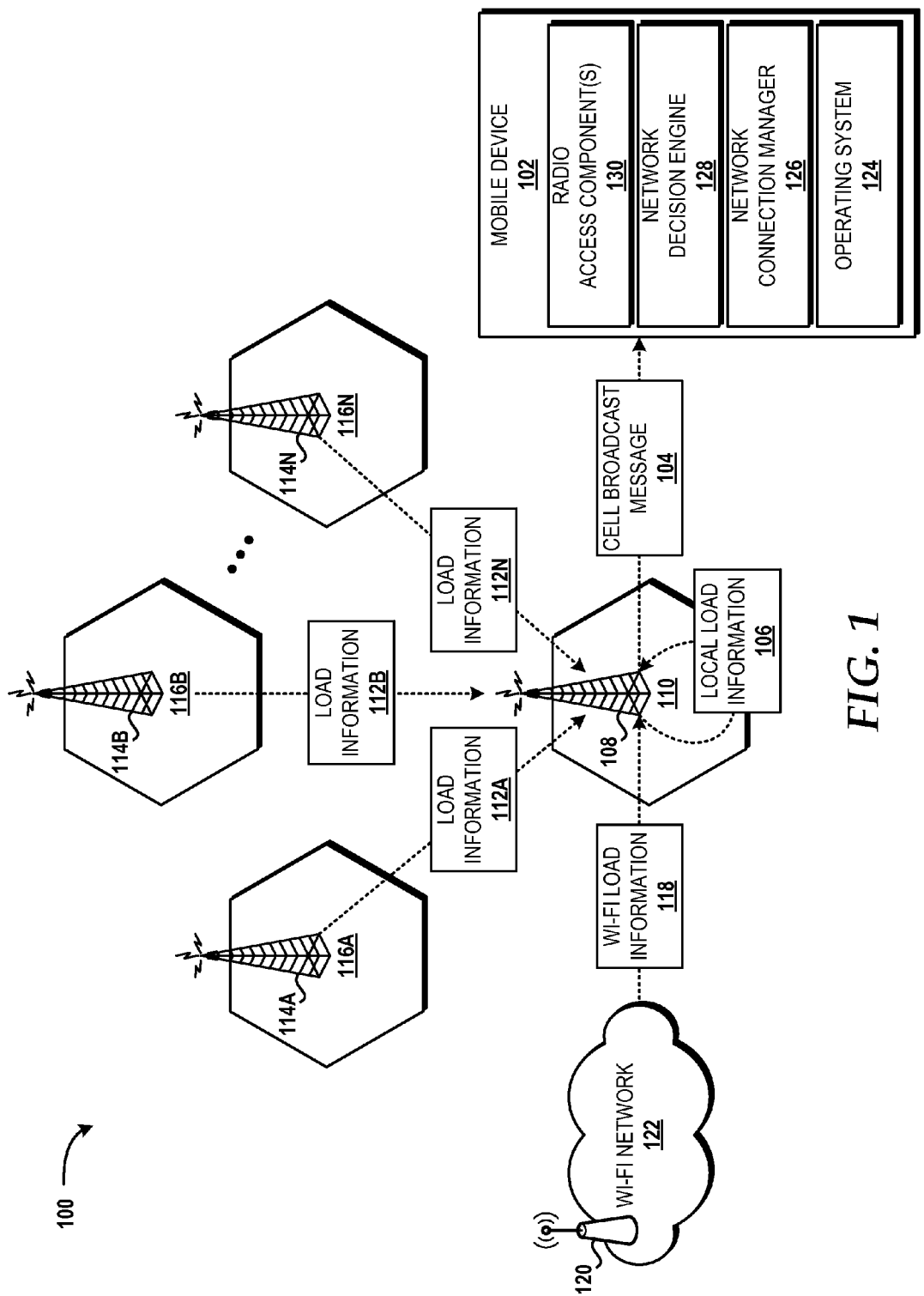
FIG. 1 is a block diagram illustrating aspects of an illustrative operating environment for various concepts disclosed herein.

Concepts and technologies are described herein for traffic steering across radio access technologies and radio frequencies utilizing cell broadcast messages. According to one aspect disclosed herein, a base station can collect load information of the base station, generate a cell broadcast message that includes the load information, and send the cell broadcast message to a target mobile device that is configured to determine, based at least in part upon the load information, which radio access network of a plurality of radio access networks to connect to.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, example aspects of traffic steering across radio access technologies and radio frequencies utilizing cell broadcast messages will be presented.

Referring now to FIG. 1, aspects of an illustrative operating environment 100 for various concepts disclosed herein will be described. It should be understood that the operating environment 100 and the various components thereof have been greatly simplified for purposes of discussion. Accordingly, additional or alternative components of the operating environment 100 can be made available without departing from the embodiments described herein.

The operating environment 100 shown in FIG. 1 includes a mobile device 102 that is configured to connect to and communicate with one or more radio access networks ("RANs") for voice and/or data communications between the mobile device 102 and one or more other mobile devices, computers, servers, networking devices, and/or other networks (not shown). The mobile device 102 is also configured to receive a cell broadcast message 104 from one or more RANs. The cell broadcast message 104 can include information regarding network load conditions of one or more RANs to which the mobile device 102 is capable of connecting. The mobile device 102 can select one or more RANs to connect to, based at least in part upon the load information included in the cell broadcast message 104.

In the illustrated example, the mobile device 102 receives the cell broadcast message 104 including local load information 106 collected by a base station 108 that is operating within a cell 110 of a RAN. As used herein, a "cell" refers to a geographical area that is served by one or more base stations operating within a RAN. As used herein, a "base station" refers to a radio receiver and/or transmitter (collectively, transceiver) that is/are configured to provide a radio/air interface by which one or more mobile devices, such as the mobile device 102, can connect to a network. Accordingly, a base station is intended to encompass one or more base transceiver stations ("BTSs"), one or more Node Bs, one or more eNodeBs, and/or other networking nodes that are capable of providing a radio/air interface regardless of the technologies utilized to do so. A base station can be in communication with one or more antennas (not shown), each of which may be configured in accordance with any antenna design specifications to provide a physical interface for receiving and transmitting radio waves to/from a network.

The cell broadcast message 104 can additionally or alternatively include at least a portion of load information 112A-112N (hereinafter, at times, referred to herein collectively or generically as "load information 112") collected by one or more other base stations 114A-114N (hereinafter, at times, referred to herein collectively or generically as "other base stations 114") that operate in corresponding cells 116A-116N (hereinafter, at times, referred to herein collectively or generically as "other cells 116") of the same RAN as the cell 110 or one or more other RANs. In some instances, the base station 108 operates utilizing a first frequency of a radio access technology ("RAT"), while one or more of the other base stations 114 operate utilizing a second frequency of the same RAT. The cell broadcast message 104 can additionally or alternatively include WI-FI load information 118 collected by one or more access points 120 that provide a WI-FI network 122. The access point(s) 120 can send the WI-FI load information 118 to the base station 108 via WI-FI broadcast or other mechanisms, as will be described in greater detail below with reference to FIG. 2.

The mobile device 102 may be a cellular phone, a feature phone, a smartphone, a mobile computing device, a tablet computing device, a portable television, a portable video game console, or any other computing device that is configured to connect to and communicate with one or more RANs via one or more radio access components. In some embodiments, the mobile device 102 includes an integrated or external radio access component that facilitates wireless communication with one or more RANs. The radio access component may be a cellular telephone that is in wired or wireless communication with the mobile device 102 to facilitate a tethered data connection to one or more RANs. Alternatively, the access component includes a wireless transceiver configured to send data to and receive data from one or more RANs and a universal serial bus ("USB") or another communication interface for connection to the mobile device 102 so as to enable tethering. In any case, the mobile device 102 can wirelessly communicate with one or more RANs over a radio/air interface in accordance with one or more RATs. The mobile device 102 may also initiate, receive, and/or maintain voice calls with one or more other voice-enabled telecommunications devices such as other mobile devices or landline devices (not shown). The mobile device 102 may also exchange Short Message Service ("SMS") messages, Multimedia Message Service ("MMS") messages, email, and/or other messages with other devices (not shown).

The cell broadcast message 104 can include any message that is capable of being sent to the mobile device 102 from a base station over a radio/air interface. The cell broadcast message 104 can be sent to the mobile device 102 using any physical, transport, and/or logical channels. These channel types are generally known and therefore are not described in greater detail herein.

In some embodiments, the cell broadcast message 104 is a System Information Block ("SIB"). In some other embodiments, the cell broadcast message 104 is included in a SIB that contains other information. The SIB may be a new SIB configured to include load information such as the local load information 106, the load information 112, and/or the WI-FI load information 118. Alternatively, the SIB may be an existing SIB that has been modified to include load information.

In some embodiments, the cell broadcast message 104 is an SMS message. In these embodiments, the base station 108 can send the cell broadcast message 104 to the mobile device 102, and potentially to one or more other mobile devices that are connected to the base station 108 or otherwise operating within the cell 110, via SMS Cell Broadcast ("SMS-CB"). Alternatively, in these embodiments, the base station 108 can send the cell broadcast message 104 to the mobile device 102 via SMS Peer-to-Peer ("SMPP"). The cell broadcast message 104 may be sent to the mobile device 102 via other messaging services including, but not limited to, MMS, Wireless Application Protocol ("WAP") push message, Unstructured Supplementary Service Data ("USSD"), or any combination thereof. It should be understood that network elements, such as Short Message Service Centers ("SMSCs"), Multimedia Message Service Centers ("MMSCs"), WAP servers, USSD servers, and the like, that support the aforementioned messaging services are not illustrated merely for ease of description.

In the illustrated example, the mobile device 102 receives the cell broadcast message 104 from the base station 108. Alternatively or additionally, the mobile device 102 can receive one or more cell broadcast messages from any number of base stations such as one or more of the other base stations 114. Also in the illustrated example, the cell broadcast message 104 includes the local load information 106, the load information 112, and the WI-FI load information 118. However, it is contemplated that the cell broadcast message 104 may include only the local load information 106, only the load information 112A, only the load information 112B, only the load information 112N, only the WI-FI load information 118, or any combination thereof.

The mobile device 102 includes an operating system 124, a network connection manager 126, a network decision engine 128, and one or more radio access components 130. The operating system 124 is a program for controlling the operation of the mobile device 102. The operating system 124 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The network connection manager 126 can be configured to manage all or a portion of the network connections available to the mobile device 102 at a given time, including, for example, connections established via one or more WI-FI radios and/or one or more cellular radios of the mobile device 102 such as one or more of the radio access components 130. In some embodiments, the network connection manager 126 is included as part of the operating system 124 and/or another application stored on the mobile device 102 such as the network decision engine 128.

The network decision engine 128 utilizes network load information included in cell broadcast messages, such as the cell broadcast message 104, to determine to which network the mobile device 102 should connect. In some embodiments, the network decision engine 128 is an application program that includes computer-executable instructions that, when executed by one or more processors of the mobile device 102, cause the mobile device 102 to analyze the network load information included in one or more cell broadcast messages to select one or more RANs and instruct the mobile device 102, and more particularly, the network connection manager 126, to connect to the selected RAN(s).

In some embodiments, the local load information 106, the load information 112, and/or the WI-FI load information 118 includes historic network load information. Historic network load information is used herein to describe load information obtained based upon network load experienced by the base station 108, one or more of the other base stations 114, and/or the WI-FI access point(s) 120 in the past or otherwise in non-real-time. In some embodiments, historic network load information is utilized by the mobile device 102 to identify one or more network load trends over a specified period of time. This trending network load information can be useful to the mobile device 102 to predict times during which network load is favorable or not to support communications between the mobile device 102 and one or more RANs.

In some other embodiments, the local load information 106, the load information 112, and/or the WI-FI load information 118 includes current network load information. Current network load data is used herein to describe network load data that is obtained based upon a network load experienced by the base station 108, one or more of the other base stations 114, and/or the WI-FI access point(s) 120 in real-time or near real-time. Real-time, in this context, is the actual time during which a network load is experienced by the base station 108, one or more of the other base stations 114, and/or the WI-FI access point(s) 120. Near real-time, in this context, is the actual time during which a network load is experienced by the base station 108, one or more of the other base stations 114, and/or the WI-FI access point(s) 120 plus a delay on the order of seconds, minutes, or any order of magnitude thereof, for example.

What constitutes near-real time network load information versus historic network load information can be defined by a service provider providing service via the base station 108, one or more of the other base stations 114, and/or the WI-FI access point(s) 120. It should be understood that real-time network load information associated with a real-time network load of the base station 108, one or more of the other base stations 114, and/or the WI-FI access point(s) 120, and near real-time network load information associated with a near real-time network load of the base station 108, one or more of the other base stations 114, and/or the WI-FI access point(s) 120 might be received by the mobile device 102 with delay caused by latency and/or other network phenomena. Moreover, this delay may increase with the additional time needed to generate the cell broadcast message 104 including the local load information 106, the load information 112, and/or the WI-FI load information 118, and send the cell broadcast message 104 to the mobile device 102.

In some embodiments, the network decision engine 128 utilizes additional information to select one or more RANs. This information can include, but is not limited to, one or more policies and/or one or more user profiles. As used herein, the term "policy" refers to one or more settings, one or more configurations, one or more rules, and/or the like that define, at least in part, one or more courses or methods of action in light of one or more conditions to be used in a determination made by the mobile device 102 regarding to which RAN(s) the mobile device 102 should connect. In some embodiments, a policy includes one or more rules that specify one or more if-then conditions by which to handle a particular situation, such as redirecting network traffic based upon network load experienced by the base station 108 and/or one or more of the other base stations 114 and that is reported to the mobile device 102 in the cell broadcast message 104. In some other embodiments, a policy includes one or more matrices of cause and effect conditions, tables of actions, or the like for responding to or otherwise dealing with certain stimuli, such as network conditions evidenced by the local load information 106, the load information 112, the WI-FI load information 118, and/or other stimuli.

As used herein, the term "user profile" refers to a collection of data associated with a user that accesses one or more RANs via a device such as the mobile device 102. A user in this context refers to an individual or other entity. A user profile can define information regarding a service agreement between a user and one or more service providers that provide a service, at least in part, via one or more RANs. The service agreement may include terms of service for pre-paid and/or post-paid service. The service agreement may include terms of roaming agreements between two or more mobile telecommunications carriers. The service agreement may define a service tier for the user. A service tier may establish a priority for a user in regard to utilizing network resources to connect to one or more RANs via the mobile device 102.

As used herein, a RAN may operate in accordance with one or more mobile telecommunications standards including, but not limited to, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other 802.XX technologies, and/or the like. A RAN can utilize various channel access methods (which may or may not be used by the aforementioned standards) including, but not limited to, Time Division Multiple Access ("TDMA"), Frequency Division Multiple Access ("FDMA"), Single Carrier FDMA ("SC-FDMA"), CDMA, wideband CDMA ("W-CDMA"), Orthogonal Frequency Division Multiplexing ("OFDM"), Space Division Multiple Access ("SDMA"), and/or the like to provide a radio/air interface to the mobile device 102. Data communications can be provided in part by a RAN using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, a RAN may be a GSM RAN ("GRAN"), a GSM EDGE RAN ("GERAN"), a UMTS Terrestrial Radio Access Network ("UTRAN"), an E-UTRAN, any combination thereof, and/or the like.

A RAN can be part of one or more mobile telecommunications networks. As used herein, a mobile telecommunications network includes one or more RANs and a wireless wide area network ("WWAN"), which may, in turn, include one or more core networks such as a circuit-switched core network ("CS CN"), a packet-switched core network ("PS CN"), and/or an IP multimedia subsystem ("IMS") core network. The WWAN can utilize one or more mobile telecommunications technologies, such as those described above, to provide voice and/or data services via one or more RANs to one or more radio components of one or more mobile devices, such as the radio access component(s) 130 of mobile device 102. Moreover, a mobile telecommunications network can provide a connection to the Internet or other WAN so that the mobile device 102 can access Internet content such as Websites, streaming media, online video games, downloadable content, and the like.

As mentioned above, the cell 110 and the other cells 116 may be part of the same RAN or any number of different RANs. In some instances, the mobile device 102 is capable of simultaneous connection to the cell 110 in addition to one or more of the other cells 116. As such, in some embodiments, the mobile device 102 is a multi-mode device. The cell 110 and the other cells 116 can be any shape and can have any dimensions. Thus, the illustrated embodiment should be understood as being illustrative, and should not be construed as being limiting in any way.

The WI-FI network 122 and the access point(s) 120 may operate in accordance with one or more Institute of Electrical and Electronic Engineers ("IEEE") 802.11 standards such as IEEE 802.11a, 802.11b, 802.11g, 802.11n, and/or future 802.11 standard (referred to herein collectively as "WI-FI"). Draft 802.11 standards are also contemplated. In some implementations, an access point is a mobile device or other computing device that functions as a WI-FI hotspot. In some implementations, the mobile device 102 is configured to connect to the WI-FI network 122 via one or more secure connections, each of which may utilize an encryption technology such as, but not limited to, WI-FI Protected Access ("WPA"), WPA2, Wired Equivalent Privacy ("WEP"), and/or the like. Moreover, the WI-FI network 122 can provide a connection to the Internet or other WAN so that the mobile device 102 can access Internet content such as Websites, streaming media, online video games, downloadable content, and the like.

As used herein, a RAT can refer to any mobile telecommunications standard or draft standard thereof, any IEEE 802.11 standard or draft standard thereof, or any other technology by which a mobile device, such as the mobile device 102, can wirelessly access a RAN.

It should be understood that some implementations of the operating environment 100 may include additional functionality or include less functionality than described above. Thus, the illustrated embodiment should be understood as being illustrative, and should not be construed as being limiting in any way.

Figure 2:
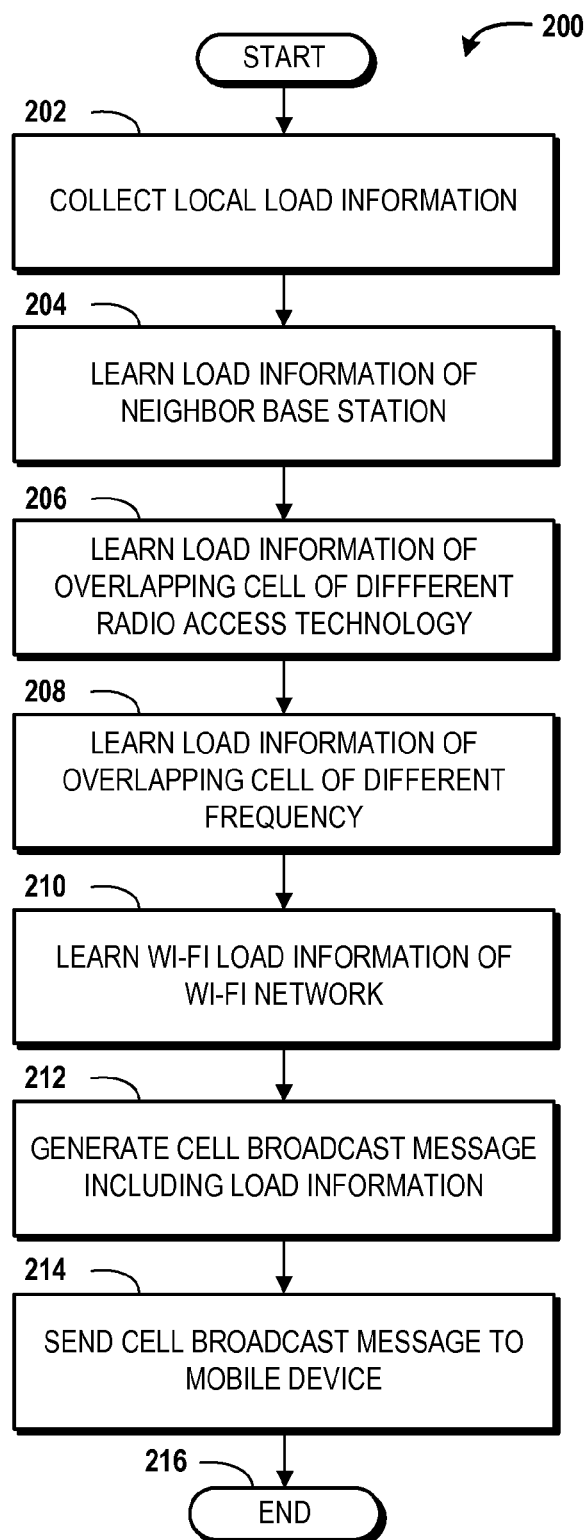
FIG. 2 is a flow diagram illustrating aspects of a method for generating a cell broadcast message that includes network load information, according to an illustrative embodiment.

Turning now to FIG. 2, a flow diagram illustrating aspects of a method 200 for generating a cell broadcast message that includes network load information will be described, according to an illustrative embodiment. It should be understood that the operations of the illustrative methods disclosed herein are not necessarily presented in any particular order and that performance of some or all of the operations in an alternative order(s) is possible and is contemplated. The operations have been presented in the demonstrated order for ease of description and illustration. Operations may be combined, separated, added, omitted, modified, and/or performed simultaneously or in another order without departing from the scope of the subject disclosure.

It also should be understood that the illustrated methods can be ended at any time and need not be performed in their entirety. Some or all operations of the methods, and/or substantially equivalent operations, can be performed by execution of computer-executable instructions included on a computer-readable storage media, as defined below. The term "computer-executable instructions," and variants thereof, as used in the description and claims, is used expansively herein to include routines, application programs, software, application modules, program modules, components, data structures, algorithms, and the like. Computer-executable instructions can be implemented on various system configurations, including single-processor or multi-processor systems, distributed computing systems, minicomputers, mainframe computers, personal computers, hand-held computing devices, microprocessor-based, programmable consumer electronics, combinations thereof, and the like.

Thus, it should be appreciated that the logical operations described herein may be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof The method 200 is described from the perspective of the base station 108. As such, the method 200 is described with additional reference to FIG. 1. The method 200 begins and proceeds to operation 202, wherein the base station 108 collects the local load information 106. The local load information 106 can include radio link utilization information and/or transport link utilization information associated with the utilization of resources available to the base station 108. In some embodiments, the base station 108 collects radio link utilization information and transport link utilization information, and then calculates a composite load level of the base station 108 for inclusion in the cell broadcast message 104. A composite load level can be calculated utilizing any load calculation method, which, for example, may be selected by or for a service provider operating the base station 108 based upon the needs of the service provider.

From operation 202, the method 200 proceeds to operation 204, wherein the base station 108 learns the load information 112 from one or more neighbor base stations, which may include one or more of the other base stations 114, that operate within the same RAN. In some embodiments, the base station 108 learns the load information 112 utilizing a self-organizing network or self-optimizing network feature such as provided by $3^{rd}$ Generation Partnership Project ("3GPP") and/or New Generation Mobile Networks ("NGMN"). In particular, the base station 108 can utilize the Automatic Neighbor Relation ("ANR") detection feature of LTE to detect one or more of the other base stations 114 and collect the load information 112 therefrom. Other mechanisms by which the base station 108 can learn load information of one or more neighboring cells are contemplated.

From operation 204, the method 200 proceeds to operation 206, wherein the base station 108 learns the load information 112 of one or more overlapping cells that may include one or more of the other cells 116 in which one or more of the other base stations 114 operate, and that utilize a different RAT than the RAT utilized by the base station 108. For example, the base station 108 and one or more of the other base stations 114 may operate in accordance with different RATs, and may also overlap in radio range such that the base station 108 is capable of receiving signals broadcast by one or more of the other base stations 114. In such a configuration, the base station 108 can learn the load information 112 from the other base stations 114 and utilize this information to enhance the collective load information provided to the mobile device 102 in the cell broadcast message 104.

From operation 206, the method 200 proceeds to operation 208, wherein the base station 108 learns the load information 112 of one or more overlapping cells that may include one or more of the other cells 116 in which one or more of the other base stations 114 operate, and that utilize a different frequency than the frequency utilized by the base station 108. For example, the base station 108 and one or more of the other base stations 114 may operate in accordance with different radio frequencies, and may also overlap in radio range such that the base station 108 is capable of receiving signals broadcast by one or more of the other base stations 114. In such a configuration, the base station 108 can learn the load information 112 from the other base stations 114 and utilize this information to enhance the collective load information provided to the mobile device 102 in the cell broadcast message 104.

From operation 208, the method 200 proceeds to operation 210, wherein the base station 108 learns the WI-FI load information 118 from the WI-FI network 122. In some embodiments, the base station 108 is configured to detect the availability of the WI-FI network 122 and query the WI-FI network 122 for the WI-FI load information 118. Alternatively, the WI-FI network 122, and more particularly, the access point(s) 120, can broadcast the WI-FI load information 118 to the base station 108. Other mechanisms by which the base station 108 can learn the WI-FI load information 118 are contemplated.

From operation 210, the method 200 proceeds to operation 212, wherein the base station 108 generates the cell broadcast message 104 including at least a portion of the local load information 106, the load information 112, and/or the WI-FI load information 118 collected at operations 202-210. From operation 212, the method 200 proceeds to operation 214, wherein the base station 108 sends the cell broadcast message 104 to one or more mobile devices, including the mobile device 102. From operation 214, the method 200 proceeds to operation 216, wherein the method 200 may end.

Although the method 200 is described as being performed for one base station, in some implementations, the method 200 is utilized by a plurality of base stations operating in the same RAN and/or across multiple RANs that may utilize the same or different RAT and/or the same or different radio frequency. Accordingly, in these implementations, mobile devices operating within various RANs can receive one or more cell broadcast messages that provide insight into the load conditions of the various RANs to which the mobile devices are capable of connecting. For cases in which a single cell broadcast message is utilized, network load information of one or more cells can be concatenated within the same message. The mobile devices can then utilize this information at least in part to select one or more of the RANs and connect to the select RANs.

In some embodiments, load information is sent in an order of priority based upon, for example, load conditions and/or other factors, such as, but not limited to, RAT, frequency band, and carrier preferences. The priority order can convey to a mobile device the preference of RAT, frequency band, and/or cellular network the mobile device should select. If a single cell broadcast message is used, load information can be concatenated and listed within the cell broadcast message in an order of priority.

Figure 3:
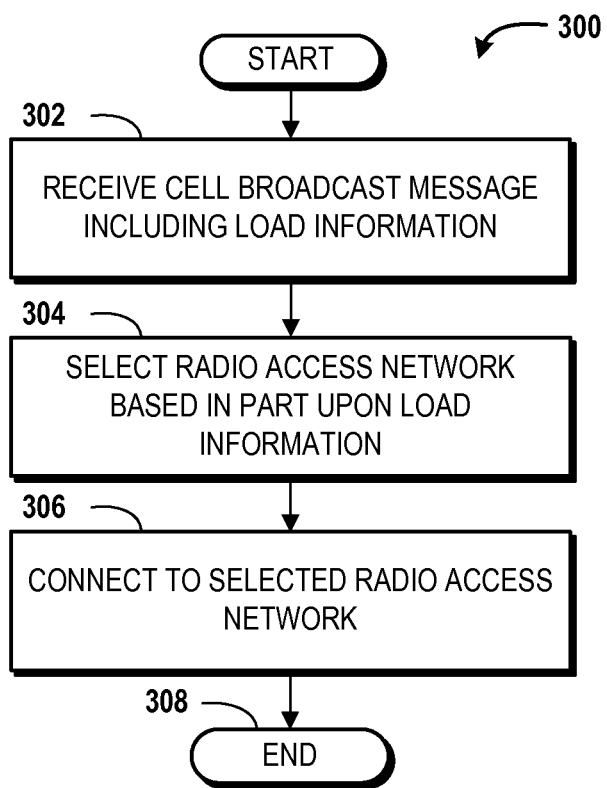
FIG. 3 is a flow diagram illustrating aspects of a method for utilizing network load information received in a cell broadcast message to select a radio access network, according to an illustrative embodiment.

Turning now to FIG. 3, a flow diagram illustrating aspects of a method 300 for utilizing load information received in a cell broadcast message to select a RAN will be described, according to an illustrative embodiment. The method 300 is described from the perspective of the mobile device 102. As such, the method 300 is described with additional reference to FIG. 1.

The method 300 begins and proceeds to operation 302, wherein the mobile device 102 receives the cell broadcast message 104 from the base station 108. The cell broadcast message 104 can include at least a portion of the local load information 106, the load information 112, and/or the WI-FI load information 118 collected at operations 202-210 of the method 200, described above. From operation 302, the method 300 proceeds to operation 304, wherein the mobile device 102 executes the network decision engine 128 to select a RAN based in part upon the load information included in the cell broadcast message 104. In some embodiments, the network decision engine 128 factors one or more policies and/or one or more user profiles for a user of the mobile device 102 in selecting one or more RANs. From operation 304, the method 300 proceeds to operation 306, wherein the mobile device 102 connects to the selected RAN. From operation 306, the method 300 proceeds to operation 308, wherein the method 300 may end.

In some embodiments, load information is received by a mobile device in an order of priority based upon, for example, load conditions and/or other factors, such as, but not limited to, RAT, frequency band, and carrier preferences. The mobile device can utilize the priority order to determine a preference of RAT, frequency band, and/or cellular network of a carrier providing service to the mobile device and base the selection of RAN at least in part upon this preference.

Figure 4:
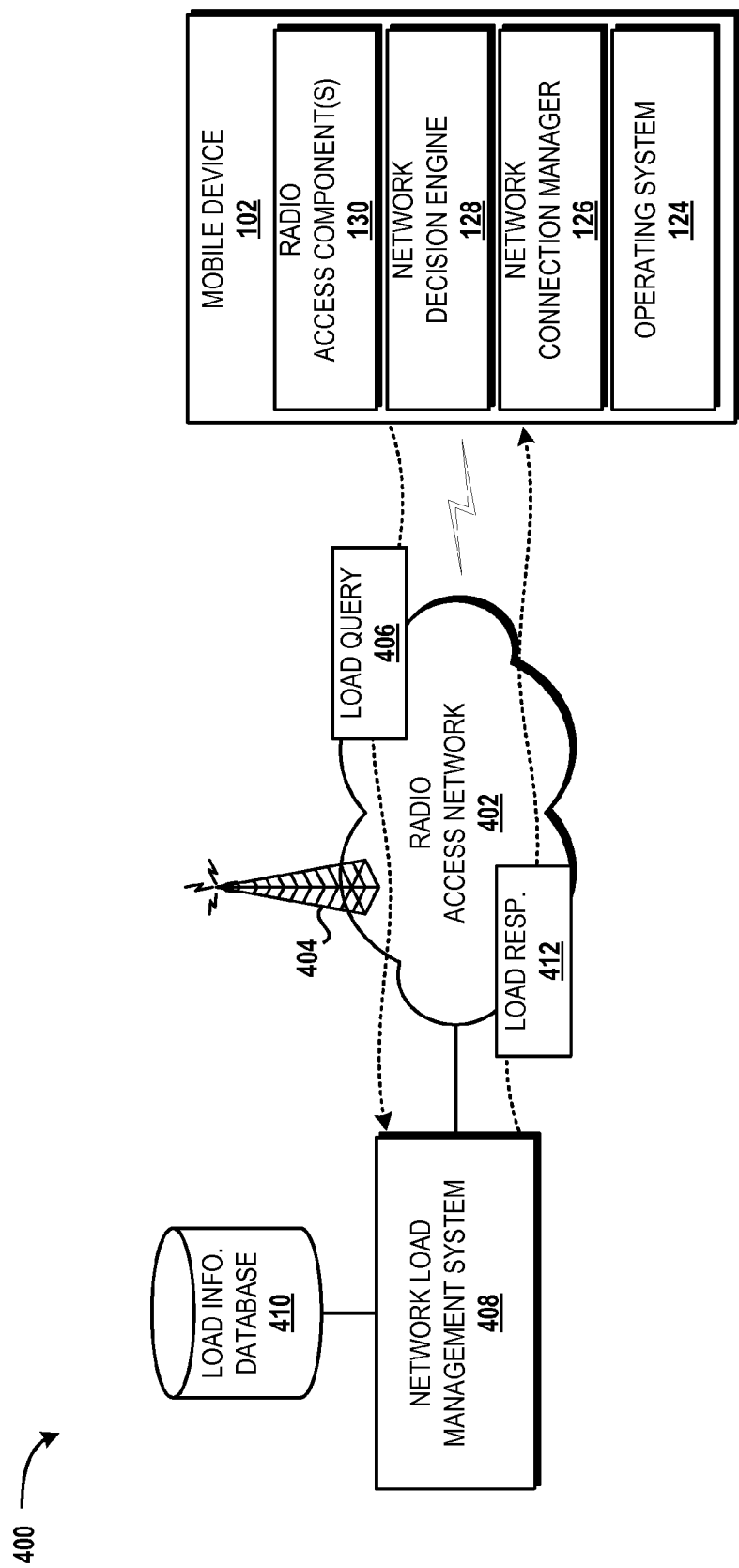
FIG. 4 is a block diagram illustrating aspects of another illustrative operating environment for various concepts disclosed herein.

Turning now to FIG. 4, aspects of an illustrative operating environment 400 for various concepts disclosed herein will be described. It should be understood that the operating environment 400 and the various components thereof have been greatly simplified for purposes of discussion. Accordingly, additional or alternative components of the operating environment 400 can be made available without departing from the embodiments described herein.

The operating environment 400 shown in FIG. 4 includes the mobile device 102, which is described above in greater detail with reference to FIG. 1. In the operating environment 400, the mobile device 102 is configured to connect to and communicate with a RAN 402. The RAN 402 can operate in accordance with any of the technologies described herein above. In the illustrated embodiment, the RAN 402 includes an SIB-incompatible base station 404. The SIB-incompatible base station 404 does not support SIBs including load information (hereinafter "load-based SIB"). In such instances, the mobile device 102, and more particularly, the network decision engine 128, can generate a load query 406 and send the load query 406 to a network load management system 408. In response, the network load management system 408 can obtain the load information requested in the load query 406 from a load information database 410 and provide the requested load information to the mobile device 102 in a load query response 412 ("load response 412").

The network load management system 408 receives network load information from the RAN 402 and stores the network load information in the load information database 410. The network load information can include any of the various types of network load information described above. The network load management system 408, in some embodiments, requests load information from the RAN 402 and, more particularly, one or more network elements operating within the RAN 402 such as the SIB-incompatible base station 404. As such, the network load management system 408 can be in a pull configuration with one or more network elements of the RAN 402. In some other embodiments, the network load management system 408 receives the network load information pushed by one or more network elements of the RAN 402. Although the network load management system 408 is illustrated as being external to the RAN 402, the network load management system 408 can operate within the RAN 402 or elsewhere within a mobile telecommunications network that includes the RAN 402.

Although the network load management system 408 is illustrated as being in communication with a single RAN, the network load management system 408 may be in communication with any number of RANs to receive load information therefrom. Moreover, the network load information received from the RAN 402 can include network load information for one or more other RANs that operate in accordance with other technologies and/or frequencies.

The mobile device 102 can generate the load query 406 on a periodic basis, which may be pre-defined, for example, by a service provider operating the RAN 402 and provided to the mobile device 102. In some embodiments, the load query 406 is sent more or less frequently based upon the performance characteristics of the current served technology provided via the RAN 402, the performance of the service provider that operates the RAN 402, and/or the performance of one or more layers of a mobile telecommunications network that includes the RAN 402.

In some embodiments, the mobile device 102 generates the load query 406 including the served physical cell ID ("PCI") for the cell to which the mobile device 102 is connected, the cell ID, and/or the Service Set Identifier ("SSID") (if the RAN 402 includes or is otherwise capable of receiving load information from a nearby a WI-FI network) in the load query 406. In these embodiments, the network load management system 408 can send the corresponding load information to the mobile device 102 and one or more neighboring cells. In this manner, load balancing works in the presence or absence of radio technologies/base stations with load-based SIB support.

Figure 5:
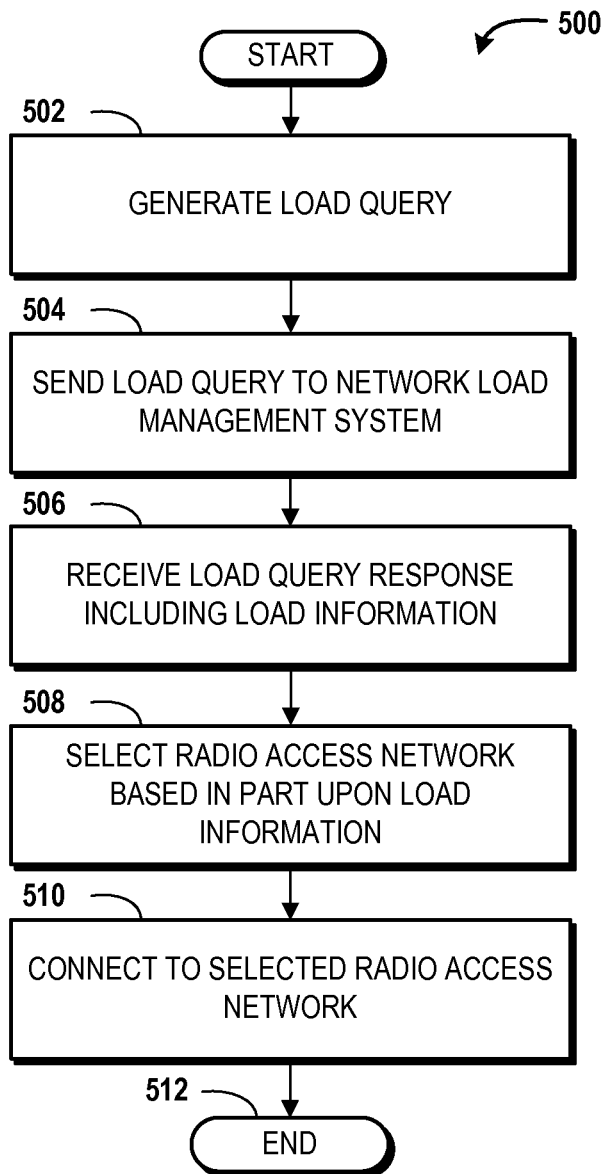
FIG. 5 is a flow diagram illustrating aspects of a method for generating a load query, according to an illustrative embodiment.

Turning now to FIG. 5, a flow diagram illustrating aspects of a method 500 for generating a load query will be described, according to an illustrative embodiment. The method 500 is described with additional reference to FIG. 4. The method 500 is described from the perspective of the mobile device 102.

The method 500 begins and proceeds to operation 502, wherein the mobile device 102 generates the load query 406. From operation 502, the method 500 proceeds to operation 504, wherein the mobile device 102 sends the load query 406 to the network load management system 408. From operation 504, the method 500 proceeds to operation 506, wherein the mobile device 102 receives the load response 412 from the network load management system 408. From operation 506, the method 500 proceeds to operation 508, wherein the mobile device 102 selects a RAN based in part upon the load information included in the load response 412. From operation 508, the method 500 proceeds to operation 510, wherein the mobile device 102 connects to the selected RAN. From operation 510, the method 500 proceeds to operation 512, wherein the method 500 may end.

Figure 6:
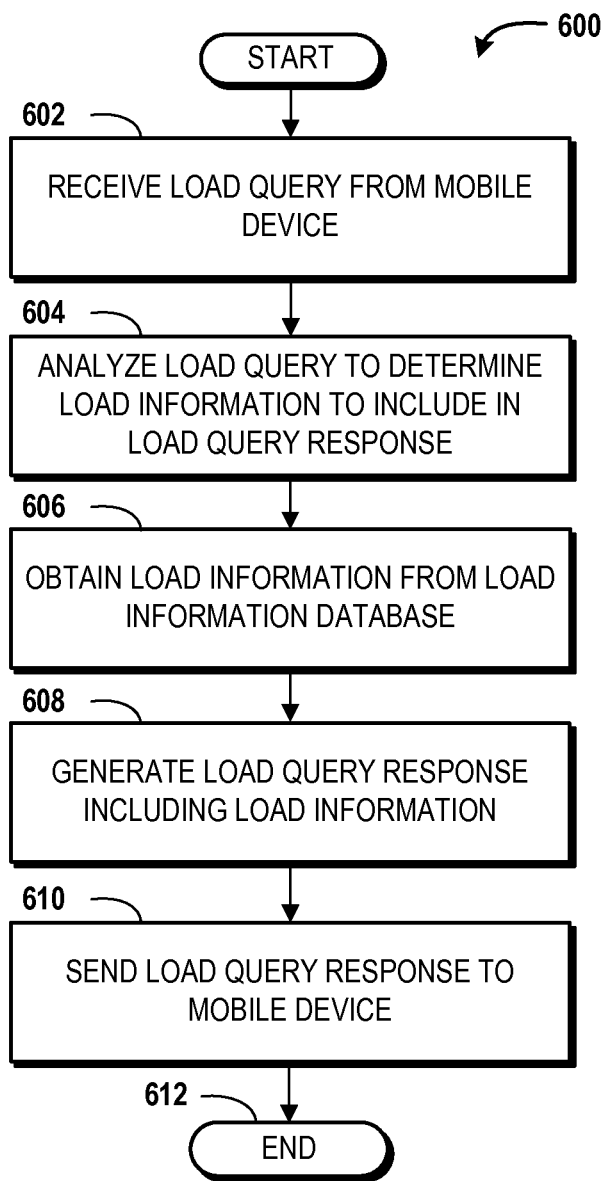
FIG. 6 is a flow diagram illustrating aspects of a method for generating a load query response, according to an illustrative embodiment.

Turning now to FIG. 6, a flow diagram illustrating aspects of a method 600 for generating a load query response will be described, according to an illustrative embodiment. The method 600 is described with additional reference to FIG. 4. The method 600 also is described from the perspective of the network load management system 408.

The method 600 begins and proceeds to operation 602, wherein the network load management system 408 receives the load query 406 from the mobile device 102. From operation 602, the method 600 proceeds to operation 604, wherein the network load management system 408 analyzes the load query 406 to determine load information to include in the load response 412. From operation 604, the method 600 proceeds to operation 606, wherein the network load management system 408 obtains the requested load information from the load information database 410.

From operation 606, the method 600 proceeds to operation 608, wherein the network load management system 408 generates the load response 412 that includes the load information obtained from the load information database 410 at operation 606. From operation 608, the method 600 proceeds to operation 610, wherein the network load management system 408 sends the load response 412 to the mobile device 102. From operation 610, the method 600 proceeds to operation 612, wherein the method 600 may end.

Figure 7:
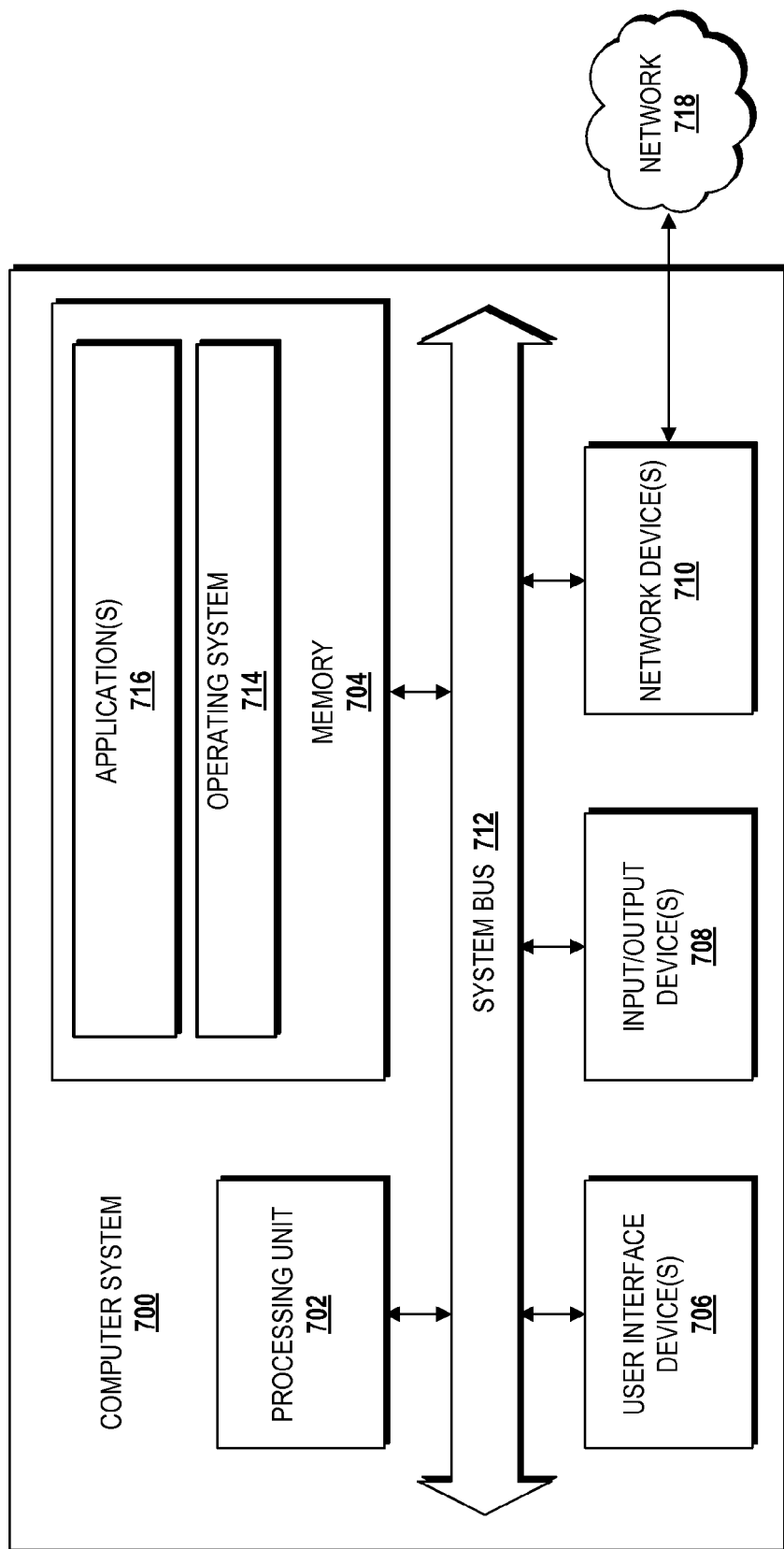
FIG. 7 is a block diagram illustrating an example computer system capable of implementing aspects of the embodiments presented herein.

FIG. 7 is a block diagram illustrating a computer system 700 configured to perform various operations disclosed herein. The computer system 700 includes a processing unit 702, a memory 704, one or more user interface devices 706, one or more input/output ("I/O") devices 708, and one or more network devices 710, each of which is operatively connected to a system bus 712. The system bus 712 enables bi-directional communication between the processing unit 702, the memory 704, the user interface devices 706, the I/O devices 708, and the network devices 710. In some embodiments, the base station 108, one or more of the other base stations 114, the WI-FI access point(s) 120, and/or the network load management system 408 is configured, at least in part, like the computer system 700. It should be understood, however, that the base station 108, one or more of the other base stations 114, the WI-FI access point(s) 120, and/or the network load management system 408 may include additional functionality or include less functionality than now described.

The processing unit 702 may be a standard central processor that performs arithmetic and logical operations, a more specific purpose programmable logic controller ("PLC"), a programmable gate array, or other type of processor known to those skilled in the art and suitable for controlling the operation of the computer system 700. Processing units are generally known, and therefore are not described in further detail herein.

The memory 704 communicates with the processing unit 702 via the system bus 712. In some embodiments, the memory 704 is operatively connected to a memory controller (not shown) that enables communication with the processing unit 702 via the system bus 712. The illustrated memory 704 includes an operating system 714 and one or more applications 716.

The operating system 714 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like.

The user interface devices 706 may include one or more devices with which a user accesses the computer system 700. The user interface devices 706 may include, but are not limited to, computers, servers, personal digital assistants, telephones (e.g., cellular, IP, or landline), or any suitable computing devices. The I/O devices 708 enable a user to interface with the program modules. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network 718, such as one or more RANs that include the base station 114, the other base stations 114, the RAN 402 illustrated and described with reference to FIG. 4, the WI-FI network 122, and/or other network(s). Examples of the network devices 710 include, but are not limited to, a modem, a radio frequency ("RF") or infrared ("IR") transceiver, a telephonic interface, a bridge, a router, or a network card. The network 718 may include a wireless network such as, but not limited to, a WLAN such as a WI-FI network, a WWAN, a wireless PAN ("WPAN") such as BLUETOOTH, or a wireless MAN ("WMAN"). Alternatively, the network 718 may be a wired network such as, but not limited to, a WAN such as the Internet, a LAN such as the Ethernet, a wired PAN, or a wired MAN.

The network 718 embodied as a cellular network may utilize a mobile telecommunications technology such as, but not limited to, GSM, UMTS, CDMA ONE, CDMA2000, LTE, and various other 2G, 2.5G, 3G, 4G, and greater generation mobile telecommunications technologies. In addition, mobile data communications technologies such as GPRS, EDGE, the HSPA protocol family including HSDPA, EUL or otherwise termed HSUPA, HSPA+, and various other current and future mobile data communications technologies are contemplated for use by the network 718. Therefore, the embodiments presented herein should not be construed as being limiting to a particular mobile telecommunications technology and/or standards utilizing such technologies.

Figure 8:
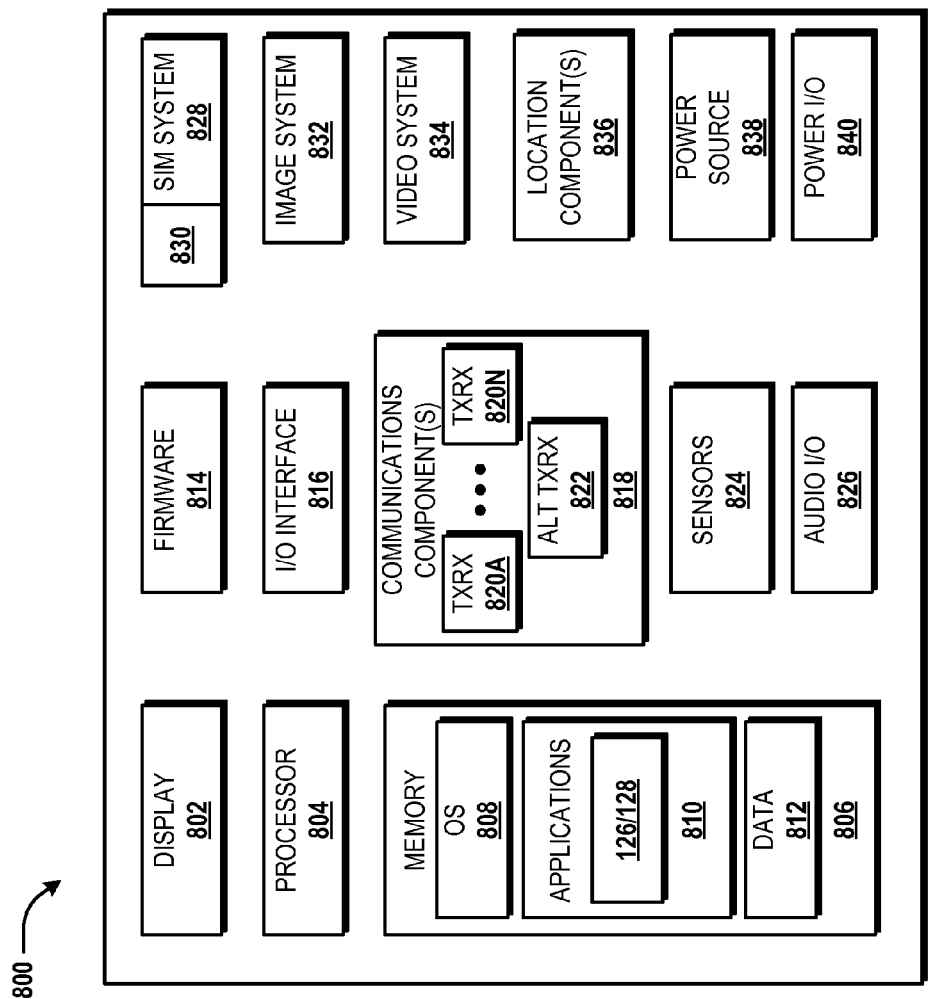
FIG. 8 is a block diagram illustrating an example mobile device capable of implementing aspects of the embodiments disclosed herein.

Turning now to FIG. 8, an illustrative mobile device 800 and components thereof will be described. In some embodiments, the mobile device 102 described above with reference to FIGS. 1 and 4 can be configured as and/or can have an architecture similar or identical to the mobile device 800 described herein in FIG. 8. It should be understood, however, that the mobile device 102 may or may not include the functionality described herein with reference to FIG. 8. While connections are not shown between the various components illustrated in FIG. 8, it should be understood that some, none, or all of the components illustrated in FIG. 8 can be configured to interact with one another to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display network connection information, various graphical user interface ("GUI") elements, text, images, video, virtual keypads and/or keyboards, messaging data, notification messages, metadata, Internet content, device status, time, date, calendar data, device preferences, map and location data, combinations thereof, and/or the like. The mobile device 800 also can include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808, one or more applications 810, which may include the network connection manager 126, the network decision engine 128, other computer-executable instructions stored in the memory 806, or the like. In some embodiments, the applications 810 also can include a UI application (not illustrated in FIG. 8).

The UI application can interface with the operating system 808, such as the operating system 124 shown in FIG. 1, to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in answering/initiating calls, data communications, entering/deleting data, entering and setting user IDs and passwords for device access, configuring settings, manipulating address book content and/or settings, multi-mode interaction, interacting with other applications 810, and otherwise facilitating user interaction with the operating system 808, the applications 810, and/or other types or instances of data 812 that can be stored at the mobile device 800. The data 812 can include, for example, load information received in a cell broadcast message, such as the local load information 106, the load information 112, and/or the WI-FI load information 118 received in the cell broadcast message 104, or load information received in a load query response, such as the load response 412.

According to various embodiments, the applications 810 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 810, the data 812, and/or portions thereof can be stored in the memory 806 and/or in a firmware 814, and can be executed by the processor 804. The firmware 814 also can store code for execution during device power up and power down operations. It can be appreciated that the firmware 814 can be stored in a volatile or non-volatile data storage device including, but not limited to, the memory 806 and/or a portion thereof.

The mobile device 800 also can include an input/output ("I/O") interface 816. The I/O interface 816 can be configured to support the input/output of data such as location information, presence status information, user IDs, passwords, and application initiation (start-up) requests. In some embodiments, the I/O interface 816 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ411) port, an RJ11 port, a proprietary port, combinations thereof, or the like. In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more networks such as the RANs 104 described herein. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments one or more of the transceivers of the communications component 818 may be configured to communicate using GSM, CDMAONE, CDMA2000, LTE, and various other 2G, 2.7G, 3G, 4G, and greater generation technology standards. Moreover, the communications component 818 may facilitate communications over various channel access methods (which may or may not be used by the aforementioned standards) including, but not limited to, TDMA, FDMA, W-CDMA, OFDM, SDMA, and the like.

In addition, the communications component 818 may facilitate data communications using GPRS, EDGE, the HSPA protocol family including HSDPA, EUL or otherwise termed HSUPA, HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to an MMS message, email message, and sent to another mobile device. The video and/or photo content also can be shared with other devices via various types of data transfers via wired and/or wireless communication devices as described herein.

The mobile device 800 also can include one or more location components 836. The location components 836 can be configured to send and/or receive signals to determine a geographic location of the mobile device 800. According to various embodiments, the location components 836 can send and/or receive signals from global positioning system ("GPS") devices, assisted-GPS ("A-GPS") devices, WI-FI/WIMAX and/or cellular network triangulation data, combinations thereof, and the like. The location component 836 also can be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 800 or other devices or computers described herein, such as the computer system 700 described above with reference to FIG. 7. For purposes of the claims, the phrase "computer-readable storage medium" and variations thereof, does not include waves, signals, and/or other transitory and/or intangible communication media, per se. In an illustrative embodiment, a computer-readable storage medium is a tangible computer-readable storage medium.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 800 in order to store and execute the software components presented herein. It is also contemplated that the mobile device 800 may not include all of the components shown in FIG. 8, may include other components that are not explicitly shown in FIG. 8, or may utilize an architecture completely different than that shown in FIG. 8.

As used herein, "cause a processor to perform operations" includes causing a processor of a computing system or computing device such as the mobile device 102, the base station 108, one or more of the other base stations 114, or the network load management system 408, to perform one or more operations of the operations and/or causing the processor to direct other components of the computing system or device to perform one or more of the operations.

Based on the foregoing, it should be appreciated that concepts and technologies for traffic steering across radio access technologies and radio frequencies utilizing cell broadcast messages have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the subject disclosure.

We claim:

1. A method comprising:
    collecting, by a first base station, first load information of the first base station, the first load information of the first base station comprising radio link load utilization information of the first base station and transport link load utilization information of the first base station, the first load information further comprising both first historic network load information obtained based upon network load experienced by the first base station in a past time and first current network load information obtained based upon network load experienced by the first base station in near real-time;
    collecting, by the first base station, from a second base station, second load information of the second base station, the second load information comprising both second historic network load information obtained based upon network load experienced by the second base station in a past time and second current network load information obtained based upon network load experienced by the second base station in near real-time;
    collecting, by the first base station, from a WI-FI access point, third load information of the WI-FI access point, the third load information comprising both third historic network load information obtained based upon network load experienced by the WI-FI access point in a past time and third current network load information obtained based upon network load experienced by the WI-FI access point in near real-time;
    generating, by the first base station, a system information block message comprising the first load information of the first base station, the second load information of the second base station, and the third load information of the WI-FI access point; and
    sending, by the first base station, the system information block message to a target mobile device configured to determine, based at least in part upon the first load information of the first base station, the second load information of the second base station, and the third load information of the WI-FI access point, which radio access network of a plurality of radio access networks to connect to.

2. The method of claim 1, wherein the first base station operates in a first radio access network and the second base station operates in a second radio access network different from the first radio access network.

3. The method of claim 1, wherein the first base station utilizes a first radio access technology and the second base station utilizes a second radio access technology different from the first radio access technology.

4. The method of claim 1, wherein the first base station utilizes a first frequency and the second base station utilizes a second frequency different from the first frequency.

5. The method of claim 1, wherein the second load information of the second base station is collected by the first base station via a self-optimizing network feature.

6. The method of claim 1, further comprising learning, by the first base station, fourth load information broadcast by a third base station, wherein the third base station overlaps in radio range with the first base station.

7. A first base station comprising:
a processor; and
a memory that stores instructions that, when executed by the processor, cause the processor to perform operations comprising
collecting first load information of the first base station, the first load information of the first base station comprising radio link load utilization information of the first base station and transport link load utilization information of the first base station, the first load information further comprising both first historic network load information obtained based upon network load experienced by the first base station in a past time and first current network load information obtained based upon network load experienced by the first base station in near real-time,
collecting, from a second base station, second load information of the second base station, the second load information comprising both second historic network load information obtained based upon network load experienced by the second base station in a past time and second current network load information obtained based upon network load experienced by the second base station in near real-time,
collecting, from a WI-FI access point, third load information of the WI-FI access point, the third load information comprising both third historic network load information obtained based upon network load experienced by the WI-FI access point in a past time and third current network load information obtained based upon network load experienced by the WI-FI access point in near real-time,
generating a system information block message comprising the first load information of the first base station, the second load information of the second base station, and the third load information of the WI-FI access point, and
sending the system information block message to a target mobile device configured to determine, based at least in part upon the first load information of the first base station, the second load information of the second base station, and the third load information of the WI-FI access point, which radio access network of a plurality of radio access networks to connect to.

8. The first base station of claim 7, wherein the first base station operates in a first radio access network and the second base station operates in a second radio access network different from the first radio access network.

9. The first base station of claim 7, wherein the first base station utilizes a first radio access technology and the second base station utilizes a second radio access technology different from the first radio access technology.

10. The first base station of claim 7, wherein the first load information of the first base station, the second load information of the second base station, and the third load information of the WI-FI access point are sent, via the system information block message, in a priority order in which the target mobile device should select from the plurality of radio access networks, wherein the priority order is based on the first load information of the first base station, the second load information of the second base station, the third load information of the WI-FI access point, a radio access technology of the first base station, a radio access technology of the second base station, a frequency band utilized by the first base station, and a frequency band utilized by the second base station.

11. The first base station of claim 7, wherein the operations further comprise learning fourth load information broadcast by a third base station, wherein the third base station overlaps in radio range with the first base station.

12. The first base station of claim 7, wherein the first base station utilizes a first frequency and the second base station utilizes a second frequency different from the first frequency.

13. A computer-readable storage medium comprising computer-executable instructions that, when executed by a processor of a first base station, cause the processor to perform operations comprising:
collecting first load information of the first base station, the first load information of the first base station comprising radio link load utilization information of the first base station and transport link load utilization information of the first base station, the first load information further comprising both first historic network load information obtained based upon network load experienced by the first base station in a past time and first current network load information obtained based upon network load experienced by the first base station in near real-time;
collecting, from a second base station, second load information of the second base station, the second load information comprising both second historic network load information obtained based upon network load experienced by the second base station in a past time and second current network load information obtained based upon network load experienced by the second base station in near real-time;
collecting, from a WI-FI access point, third load information of the WI-FI access point, the third load information comprising both third historic network load information obtained based upon network load experienced by the WI-FI access point in a past time and third current network load information obtained based upon network load experienced by the WI-FI access point in near real-time;
generating a system information block message comprising the first load information of the first base station and the second load information of the second base station; and
sending the system information block message to a target mobile device configured to determine, based at least in part upon the first load information of the first base station, the second load information of the second base station, and the third load information of the WI-FI access point, which radio access network of a plurality of radio access networks to connect to.

14. The computer-readable storage medium of claim 13, wherein the first base station operates in a first radio access network and the second base station operates in a second radio access network different from the first radio access network.

15. The computer-readable storage medium of claim 13, wherein the first base station utilizes a first radio access technology and the second base station utilizes a second radio access technology different from the first radio access technology.

16. The computer-readable storage medium of claim 13, wherein the first base station utilizes a first frequency and the second base station utilizes a second frequency different from the first frequency.

17. The computer-readable storage medium of claim 13, wherein the operations further comprise learning third load information broadcast by a third base station, wherein the third base station overlaps in radio range with the first base station.

18. The method of claim 1, wherein the first load information of the first base station, the second load information of the second base station, and the third load information of the WI-FI access point are sent, via the system information block message, in a priority order in which the target mobile device should select from the plurality of radio access networks, wherein the priority order is based on the first load information of the first base station, the second load information of the second base station, the third load information of the WI-FI access point, a radio access technology of the first base station, a radio access technology of the second base station, a frequency band utilized by the first base station, and a frequency band utilized by the second base station.

19. The computer-readable storage medium of claim 13, wherein the first load information of the first base station and the second load information of the second base station are sent, via the system information block message, in a priority order in which the target mobile device should select from the plurality of radio access networks, wherein the priority order is based on the first load information of the first base station, the second load information of the second base station, the third load information of the WI-FI access point, a radio access technology of the first base station, a radio access technology of the second base station, a frequency band utilized by the first base station, and a frequency band utilized by the second base station.

20. The method of claim 1, wherein collecting, by the first base station, from the second base station, the second load information of the second base station comprises collecting, by the first base station, from the second base station, the second base station being system information block incompatible and therefore cannot provide the system information block message to the target mobile device.

* * * * *